UNITED STATES PATENT OFFICE.

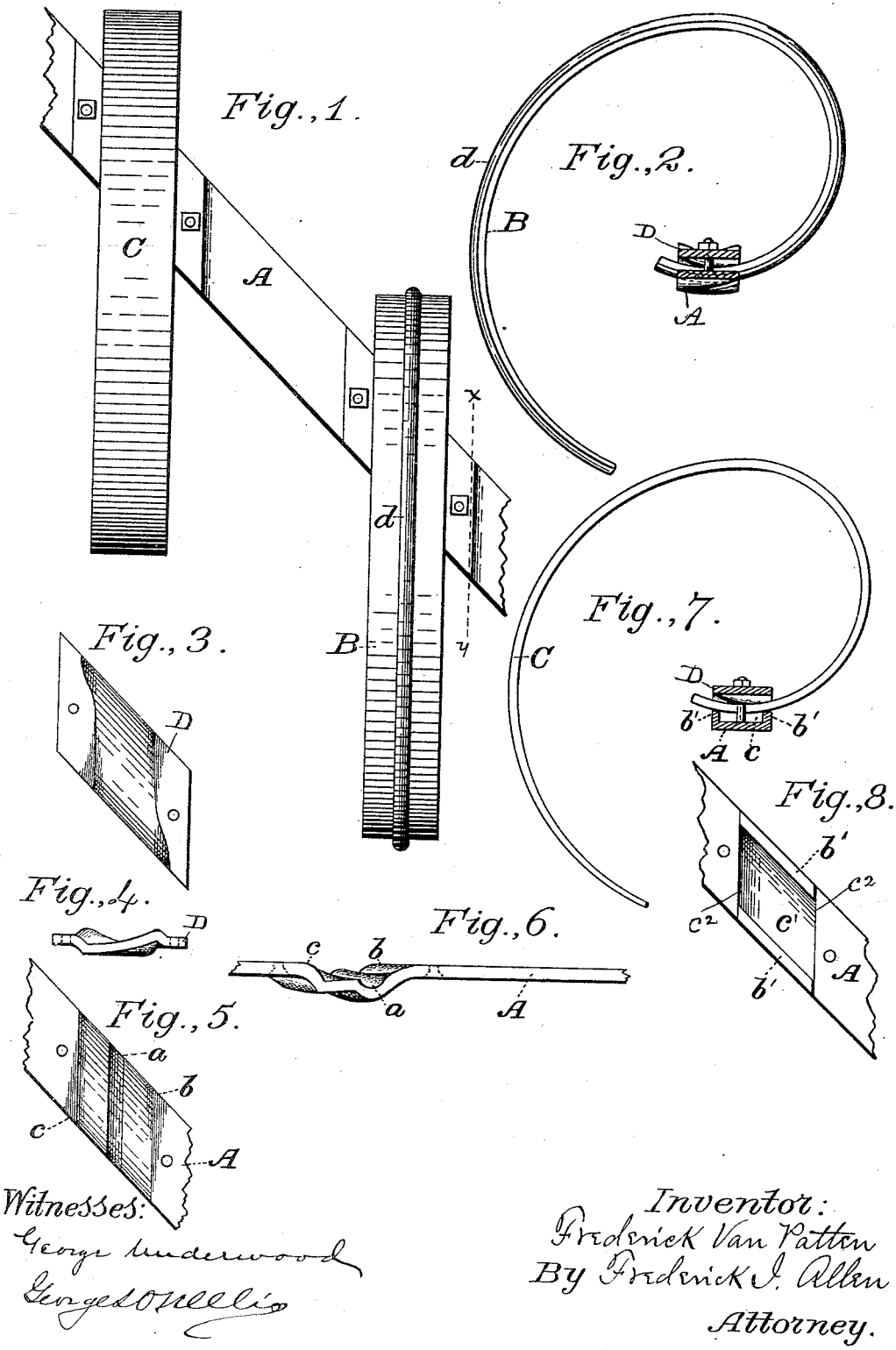

FREDERICK VAN PATTEN, OF AUBURN, NEW YORK.

SPRING-TOOTH HARROW.

SPECIFICATION forming part of Letters Patent No. 445,324, dated January 27, 1891.

Application filed November 27, 1888. Serial No. 291,953. (No model.)

*To all whom it may concern:*

Be it known that I, FREDERICK VAN PATTEN, of the city of Auburn, New York, have invented certain new and useful Improvements in Spring-Tooth Harrows, of which the following is a specification, reference being had to the accompanying drawings.

My invention relates to the devices whereby the teeth of spring-tooth harrows are secured to the frames thereof; and it consists in a new construction of the harrow-frame bars with seats formed thereon for the reception and securement of the teeth, so as to dispense with a portion of the separate tooth-holding devices or clips now used for the purpose of attaching the teeth to the frame of the harrow. At the same time the opportunities of disturbance of the relation of the harrow-tooth to the frame are diminished and the whole structure is made stronger than by the use of existing devices.

In the drawings, Figure 1 is a plan view of a portion of a bar of a harrow-frame with two spring-teeth of slightly-different forms attached thereto. Fig. 2 is a cross-section on line $x\ y$, Fig. 1. Figs. 3 and 4 are detail views of the clamp or clip. Figs. 5 and 6 are detail side and plan views, respectively, showing a seat for a tooth having a longitudinal rib; and Figs. 7 and 8 are sectional and plan views, respectively, of one form of seat for a plain tooth.

A denotes a portion of a metal bar of a harrow-frame, and B and C are spring harrow-teeth, the teeth B being each provided with a longitudinal rib $d$ and the teeth C being plain. The bar A is provided in its upper surface with integral depressed seats for the harrow-teeth, these seats having end walls to engage the sides of the teeth and hold them securely in place when clamped by the clips or clamps D. These clips or clamps D are preferably recessed on their under sides, so as to partly receive the teeth and thus have a strong hold thereon. The seats in the bar A are formed by forging or striking out by dies, or in any other suitable manner, and the seats or recesses in the clips or clamps D may be similarly made, the forms of these seats being such as to properly engage the parts of the teeth with which they are to come in contact.

Figs. 5 and 6 represent a seat having a central groove $a$ to receive the rib $d$ of a tooth B, said seat having end walls at $b$ and $c$ to engage the sides of the harrow-tooth. The depressed seat $c'$ (shown in Figs. 7 and 8) has supporting-ribs $b'$ at the sides of the bar A, and end walls $c^2$, which engage the sides of the harrow-tooth.

With spring-toothed harrows constructed in accordance with my invention the teeth are securely held in place by the clips or clamps when the latter are bolted down and all danger of displacement of the teeth is thus avoided.

Having thus described my invention, I claim and desire to secure by Letters Patent—

1. In a spring-toothed harrow, the combination, with a metallic bar A, having integral depressed seats, and end walls formed in its upper surface, of harrow-teeth fitting in said seats, and clamps or clips for securing said teeth in place.

2. In a spring-toothed harrow, the combination, with a metallic bar A, provided with integral depressed seats, having end walls formed in its upper surface, of harrow-teeth fitting in said seats, and clamps or clips having recessed lower faces to partly receive the said teeth.

3. In a spring-toothed harrow, the combination, with a metallic bar A, having in its upper surface integral depressed seats, each having a groove $a$ and end walls $b$ and $c$, of harrow-teeth B, having ribs $d$ fitting said grooves, and clamps or clips D for securing said teeth in place.

FREDERICK VAN PATTEN.

Witnesses:
FREDERICK I. ALLEN,
GEORGE UNDERWOOD.